Figure 1:
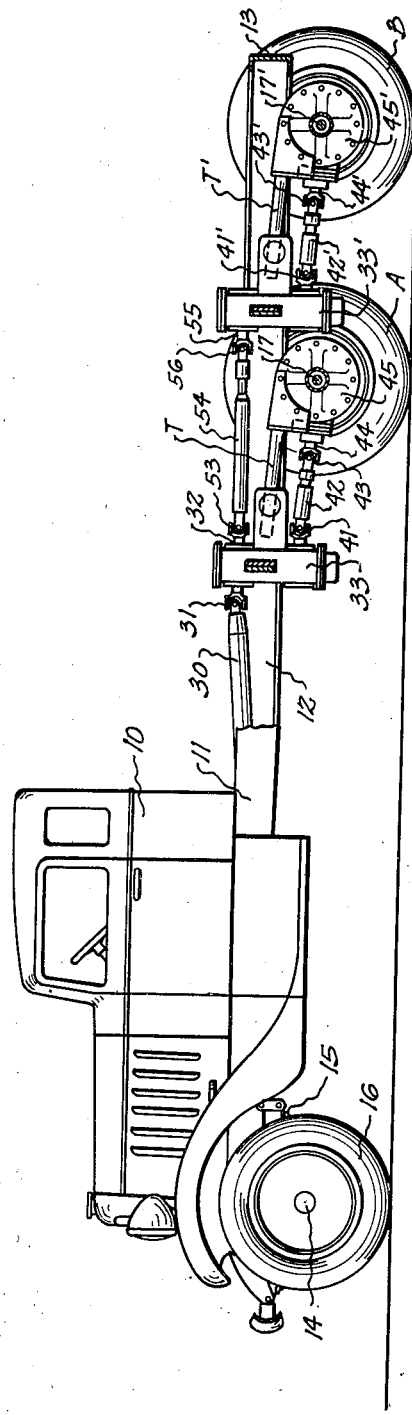

May 14, 1940.　　　C. S. SINGLETON　　　2,200,658
POWER TRANSMITTING MECHANISM FOR MOTOR VEHICLES
Filed June 23, 1938　　　3 Sheets-Sheet 1

Inventor
Clarence S. Singleton
By Jack A. Ashley
Attorney

Inventor
Clarence S. Singleton

By Jack A. Ashley
Attorney

May 14, 1940. C. S. SINGLETON 2,200,658
POWER TRANSMITTING MECHANISM FOR MOTOR VEHICLES
Filed June 23, 1938 3 Sheets-Sheet 3

Inventor
Clarence S. Singleton

By Jack A. Ashley
Attorney

Patented May 14, 1940

2,200,658

UNITED STATES PATENT OFFICE 2,200,658

POWER TRANSMITTING MECHANISM FOR MOTOR VEHICLES

Clarence S. Singleton, Longview, Tex.

Application June 23, 1938, Serial No. 215,378

5 Claims. (Cl. 180—22)

This invention relates to new and useful improvements in power transmitting mechanism for motor vehicles.

One object of the invention is to provide an improved mechanism for road vehicles having multiple drive wheels arranged in tandem or in pairs, said mechanism being operated by the usual drive shaft of the vehicle and having connection with the multiple wheels thereof to drive the same; said mechanism being particularly adaptable to trucks, tractors, etc.

An important object of the invention is to provide an improved tandem drive mechanism for driving tandem axles of a vehicle from a single drive shaft, and being so arranged that in the event one axle becomes inoperative to rotate its wheels for any reason whatever, the other axle may continue to operate, whereby the wheels of this latter axle are rotated to impart motion to the vehicle.

Another object of the invention is to provide an improved tandem drive mechanism wherein a gear box is connected with the usual drive shaft of the vehicle and an individual power transmitting unit for each axle is driven from said box, whereby the operation of one unit is unaffected by the other so that each axle may be rotated irrespective of the rotation or non-rotation of the other axle.

A further object of the invention is to provide an improved power transmitting mechanism of the character described, which includes an improved torque assembly for bracing each differential of the tandem drive wheels of the vehicle, which assembly is constructed so as to permit the wheels of each pair to undergo movement with relation to each other without placing an undue strain on the driving shafts.

Still another object of the invention is to provide an improved power transmitting mechanism wherein the individual drive shaft for each axle is capable of a limited universal movement with relation to its axle, whereby the axle may move as the wheels of the vehicle strike ruts or other irregularities in the road surface without effecting the drive connection between the shaft and its axle.

A further object of the invention is to provide an improved tandem drive mechanism for the axles of a motor vehicle, together with improved means for mounting the axles, whereby alinement of said axles is maintained and also whereby said axles may be removed without disturbing the mechanism.

A construction designed to carry out the invention will be hereinafter described, together with other features of the invention.

Figure 3:
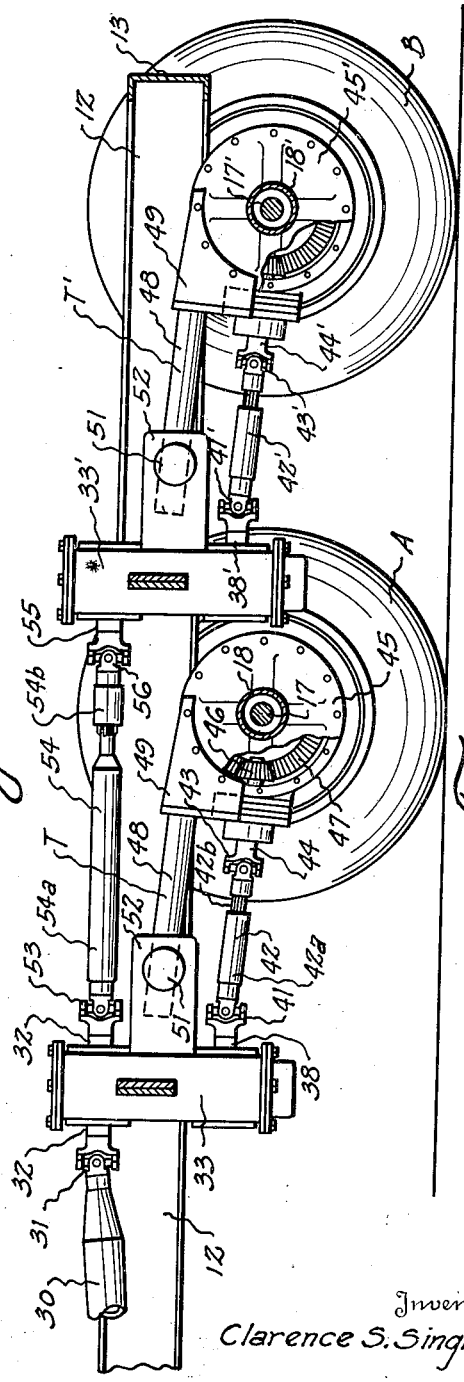
Figure 2:
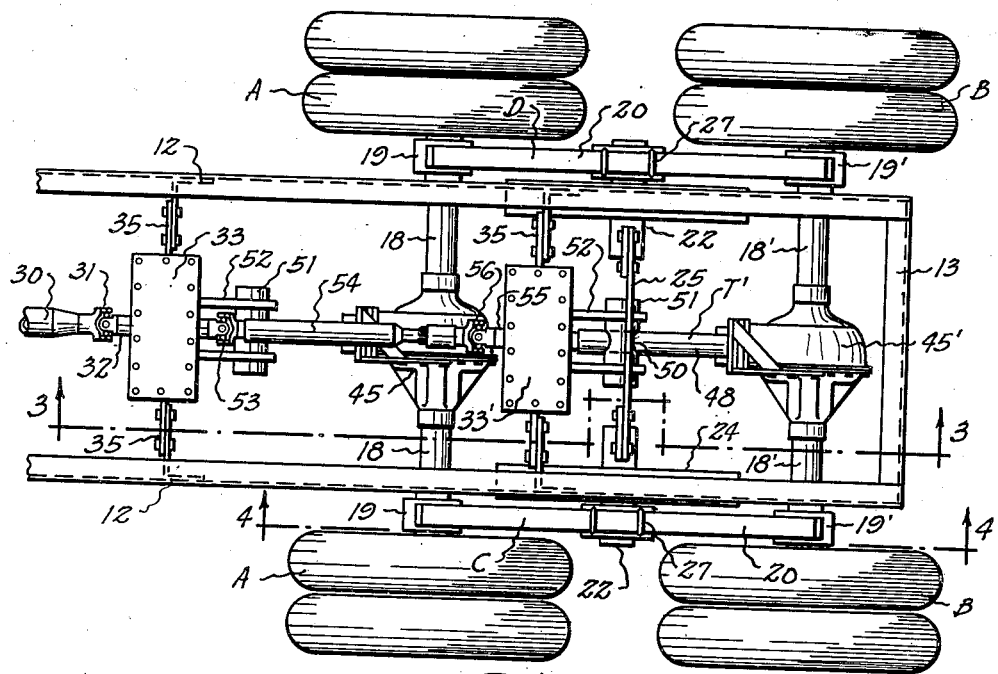
Figures 4, 6:
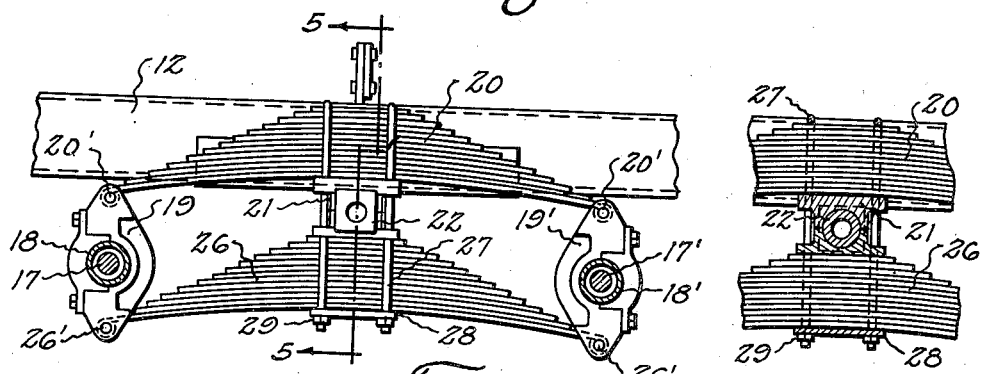
Figure 5:
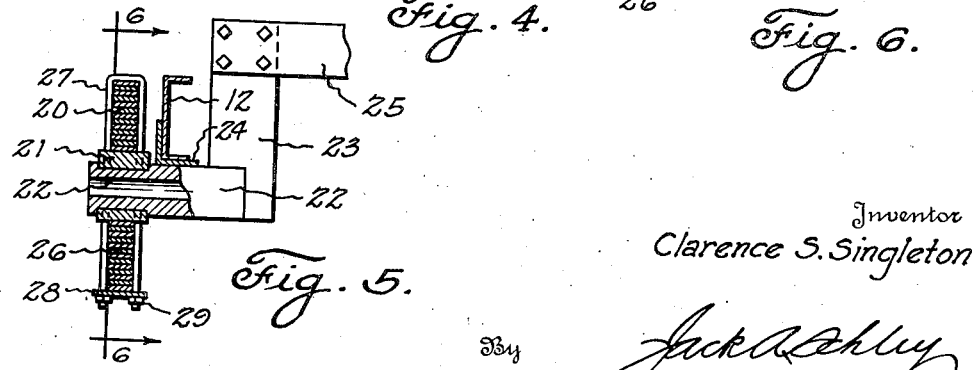
Figure 7:
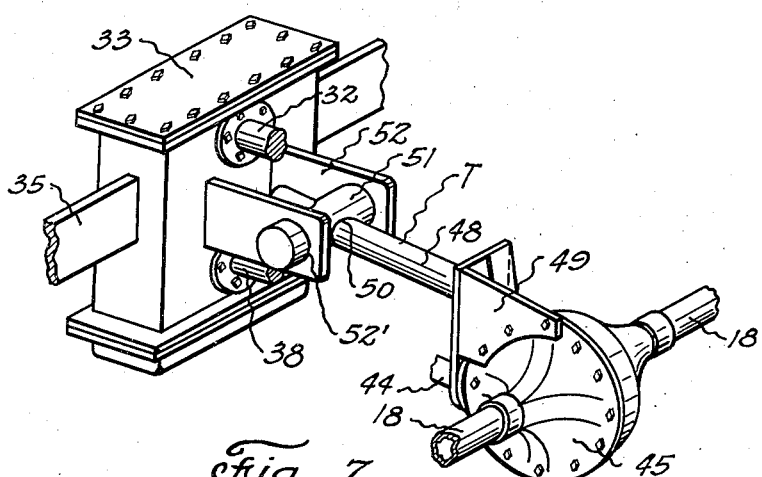
Figures 8, 9:
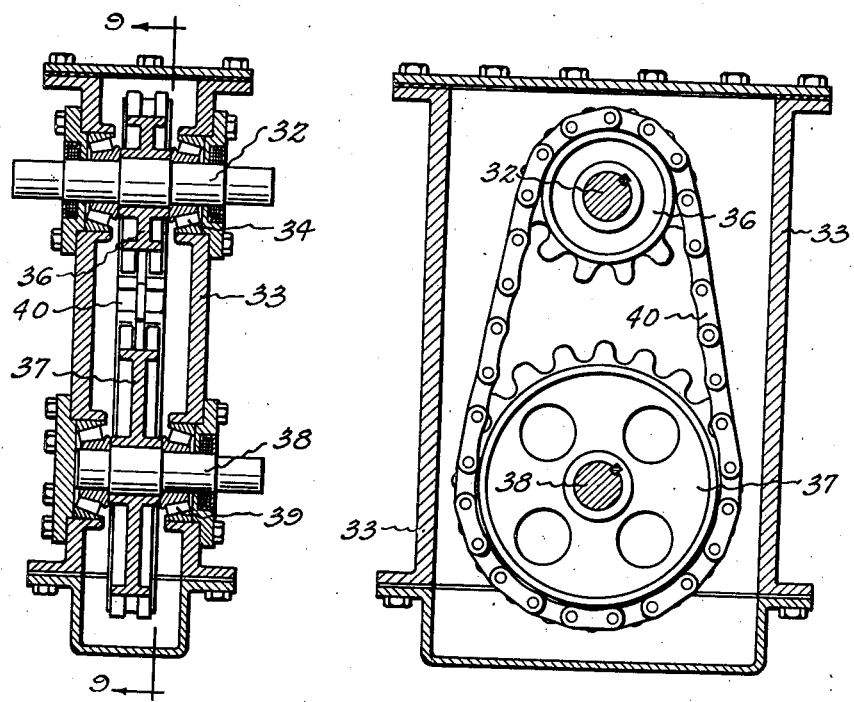

The invention will be more readily understood from a reading of the following specification and by reference to the accompanying drawings, in which an example of the invention is shown, and wherein:

Figure 1 is an elevation of a motor vehicle having an improved power transmitting mechanism applied thereto, portions of the vehicle frame being broken away to more clearly illustrate the invention, Figure 2 is a plan view of the rear portion of the vehicle frame and of the power transmitting mechanism, Figure 3 is a longitudinal, vertical, sectional view, taken on the line 3—3 of Figure 2, Figure 4 is a longitudinal, vertical, sectional view, taken on the line 4—4 of Figure 2, Figure 5 is a transverse, vertical, sectional view, taken on the line 5—5 of Figure 4, Figure 6 is a partial, vertical, sectional view, showing the mounting of the single portion of the springs and taken on the line 6—6 of Figure 5, Figure 7 is an isometric view of one of the gear boxes and illustrates the torque assembly which connects said box to one of the rear wheel differentials, Figure 8 is a transverse, vertical, sectional view taken through the gear box, and Figure 9 is a vertical, sectional view taken on the line 9—9 of Figure 8.

In the drawings, the numeral 10 designates a motor vehicle, which has been illustrated as a truck, and said vehicle includes the usual frame 11 which extends substantially through the length of the vehicle. The frame is constructed of longitudinal channel bars 12 which are disposed in spaced, parallel relation, being connected together by transverse channels 13. The forward portion of the frame has the usual motor and driver's cab mounted thereon and a front axle 14 is secured beneath the frame, being suspended on leaf springs 15 in the usual manner. Front wheels 16 having tires thereon are mounted on the axle.

The rear portion of the frame is supported on two sets A and B of rear wheels and these wheels serve to drive the vehicle as will be explained. Each set includes two pair of wheels, with each pair being mounted on the outer ends of a suitable axle. The wheels A are mounted on an axle 17, while the wheels B are mounted on a similar axle 17'. The axles extend through the usual tubular housings 18 and 18' which are located below the vehicle frame and which extend transversely thereof. The housings of the axles are clamped within a pair of split clamping members 19 and 19' which surround said housings, the halves of said members being bolted together. As is clearly shown in Figure 2, the members 19 on the housing 18 of the axle 17 are located near the extremity of said housing adjacent the wheels A, while the members 19' are similarly located on the housing 18', whereby the members are in alinement in a vertical plane and are outside of the frame 11 of the vehicle.

The axles 17 and 17' are suspended from two sets of springs C and D which are secured to the frame channels 12 on the outer side thereof. Since the two sets of springs are mounted identically, a description of one will suffice. Referring to Figure 4, the set C includes an upper leaf spring 20 which is disposed contiguous to the outer side of the frame channel 12 and which has its ends pivoted on pins 20' in the upper ends of the clamping members 19 and 19' located therebeneath. The central portion of the spring 20 rests on a split block 21 which surrounds a stub shaft 22 (Figure 5). The stub shaft has its outer end projecting beyond the frame channel 12, while its inner end is welded, or otherwise secured, to an upright supporting bar 23. It is preferable that the upper surface of the stub shaft abut the frame channel 12 and if desired, an angular brace 24 may be interposed between the channel and shaft for reinforcing said channel. The upright supporting bars 23 which carry the stub shafts 22 are connected to each other by a transverse brace 25 which has its ends bolted to the uprights.

A lower leaf spring 26, similar to the upper spring 20, extends beneath the upper spring and has its upper central portion engaging the underside of the spacing block 21. The ends of the spring 26 are pivotally secured to the clamping members 19 and 19' by means of pins 26' provided at the lower ends of said members. The upper spring 20 and the lower spring 26 are fastened together by elongate U-bolts 27 which pass through the block 21 and have their arms engaging the sides of the springs. The extremities of the U-bolts pass through a plate 28, which is disposed beneath the central portion of the spring 26, and retaining nuts 29 are threaded onto these extremities of the bolts.

With the above arrangement, the wheels A and B are mounted on the axles 17 and 17' which axles are suspended from the spring assemblies C and D secured to the frame. One pair of the wheels A is thus carried by the spring assembly C which also carries one pair of the wheels B, while the other pairs of said wheels are carried by the other spring assembly D, whereby individual movement of each pair of wheels, within certain limits, is possible. The provision and construction of the split clamping members 19' which support the axles permits either axle to be removed without disturbing the spring assemblies, C and D.

The motor of the vehicle 10 drives the usual drive shaft 30 which extends rearwardly of the vehicle frame 11 between the side channels 12 thereof. The rear end of the drive shaft is connected through a universal joint 31 with a rotatable stub shaft 32. The stub shaft extends through the upper end of a gear box or casing 33, being mounted on suitable bearings 34 (Figures 8 and 9), supported in said box. The box or casing 33 is secured centrally between the frame channels 12 by means of suitable bracket bars 35 which are bolted to the box and to the channels.

The stub shaft 32 is provided with a drive sprocket 36 which is keyed thereon and which is mounted within the box or casing 33. A large sprocket 37 is keyed on a stub shaft 38 which is journaled in bearings 39 at the lower end of the box 33 and an endless drive chain 40 passes over the sprockets 36 and 37, whereby rotation of one imparts rotation to the other. One end of the lower stub shaft 38 projects rearwardly from the box or casing 33 and is connected through a universal joint 41 with a shaft 42. This latter shaft includes two telescoping members 42a and 42b which have a splined engagement with each other and the shaft 38 has connection with the member 42a. The member 42b has connection through a universal joint 43 with a differential drive 44 which extends into the usual differential housing 45 mounted centrally on the axle housing 18. The inner end of the shaft 44 carries the usual beveled pinion 46 which is in constant mesh with a gear ring 47, both pinion and ring being housed in the differential housing and forming a part of the ordinary differential. The gear ring 47 is connected through the usual differential gearing (not shown) with the axle 17 and when rotated, rotates said axle to revolve the wheels A.

From the above, it will be seen that when the vehicle drive shaft 30 is rotated by the vehicle motor, rotation is imparted to the stub shaft 32 and then through the medium of the sprockets 36 and 37 and the chain 40, a rotation is imparted to the drive shaft 42 and differential shaft 44. This latter shaft rotates the axle 17 through the differential, whereby the wheels A are driven. The various universal joints in the power transmitting mechanism permit a certain amount of movement of the various parts of the power transmitting with relation to each other without breaking the driving connection. It is noted that if desired, a train of gears, or other driving connection, may be substituted for the sprockets 36 and 37 and chain 40 to connect the shafts 32 and 38.

For preventing rotation of the differential housing and also for holding the universals alined, as well as for maintaining the drive shaft 42 and differential shaft 44 centered in the differential housing 45, a torque arm assembly T is provided (Figure 7). This assembly includes a cylindrical rod 48 which has an arcuate bracket 49 integral with one end thereof. The bracket is bolted to the upper portion of the differential housing 45 whereby one end of the rod is fastened to the housing, while the opposite end of the rod extends through a transverse opening 50 formed in a pivot pin 51. The pin has its ends journaled in openings 52' provided in ears or brackets 52 which are integral with and extend rearwardly from the gear box or casing 33. As clearly shown in Figures 3 and 7, the ears are spaced from the rod 48 so as to permit a limited lateral movement of the rod between said ears, such movement being guided by the sliding of the pin 51 in the openings 52. The rod is also capable of a sliding movement within the opening 50 of the pin, whereby a slight variation of the distance between the differential housing 45 and the gear box, which may be caused by the wheels A striking a rut, or other irregularity, in the road surface, may occur.

When the vehicle is traveling over rough roads, one pair of wheels A may momentarily be on a different level than the other pair as ruts, or other irregularities, are encountered, and the arrangement of the torque assembly maintains the axle 17 and differential housing in place at all times. Also, the differential may swivel within certain limits, whereby the universal joints, as well as the driving elements are maintained in driving position under all road conditions so that the individual movement or position of the wheels A with relation to the frame does not in any way interfere with the driving connection between the vehicle drive shaft 30 and the differential, with the result that an efficient power transmission is obtained.

For driving the rearmost set of wheels B from the vehicle drive shaft 30, the stub shaft 32 extends completely through the gear box or casing 33, and has connection through a universal joint 53 (Figure 3) with a rotatable shaft 54. This shaft is constructed of a pair of telescoping members 54a and 54b which have a splined connection and the shaft 32 is secured to the member 54a. The member 54b is connected with a stub shaft 55 through a universal joint 56 and the shaft 55 is rotatably mounted within a second gear box or casing 33' which is constructed in a manner similar to the box 33. The shaft 55 does not extend completely through the gear box 33' but has its end terminating therein. The interior construction of the box 33' is exactly the same as the interior construction of the gear box 33, with a lower stub shaft 38', similar to the shaft 38, projecting therefrom. The shaft 38' is driven by sprockets and a drive chain, as explained, and said shaft is connected with the differential drive shaft 44' of the differential housing 45' of the axle 17' by means of a telescoping member 42' and universal joints 41' and 43', said member and joints being constructed similarly to the member 42 and universals 41 and 43, which drive the axle 17 and which have been hereinbefore described.

With the above arrangement, the rearmost axle 17' and wheels B mounted thereon, are driven by the vehicle drive shaft 30 through the medium of the stub shaft 32, connecting shaft 54 and shaft 55. As clearly shown in Figure 3, the shafts 32, 54, and 55 form a direct drive from the vehicle shaft 30 with the various universal joints connecting the shafts. From the stub shaft 55, the power is transmitted through the gear box 33' to the shaft 38', then through the member 42' to the differential drive shaft 44' of the rearmost axle 17', whereby said axle is rotated to revolve the wheels B. The drive to the wheels B is direct from the vehicle drive shaft 30 and is operated independent of the drive for the wheels A, which latter wheels are driven through the forward gear box 33. Therefore, in the event one or the other set of wheels A and B should become inoperative for any reason whatever, the other set of wheels will rotate because the power transmission to said other set is unaffected by the action of the first set. For example, if the axle 17 should break and render the drive to the wheels A inoperative this would not interfere with the transmission of power to the wheels B and thus, the vehicle can continue to operate under its own power.

For bracing the differential housing 45' of the axle 17' and also for maintaining alinement of the driving connections to the differential under various road conditions, a torque assembly T' is mounted between the housing 45' and the rearmost gear box 33'. This assembly is constructed in exactly the same manner as the torque assembly T for the front axle 17 and includes the cylindrical rod 48, mounting member 49, pin 51 and associate parts. The assembly T' operates in the same way as the assembly T and strengthens and guides the driving mechanism for the rearmost axle 17'. The assembly T, as has been explained, is associated with the front axle 17.

The tandem drive mechanism is operated from the vehicle drive shaft and each set of wheels A and B are independently driven, whereby the inoperativeness of one does not affect the other. The various universal joints in the driving connections compensate for movement of the wheels A and B, as the same move over irregularities in the road surface, whereby the power is transmitted under all road conditions. The provision of the torque assemblies, which are capable of limited universal movement, reinforce the differential housings and hold the universals and driving elements in proper driving position so that these parts are relieved of the strain occasioned by rough road conditions. In the event, either one of the axles 17 or 17' break or must be removed for any reason, this may be readily done by merely separating the clamps 19 or 19' which hold said axles. The axle and wheels carried thereby may then be removed without disassembling the spring assemblies C and D and without disassembling the tandem power transmitting mechanism.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. The combination with a motor vehicle having a pair of rear axles with ground wheels mounted thereon and also having a drive shaft, of a power transmitting mechanism including, a gear box having an upper shaft and a lower shaft which shafts are drivingly connected to each other, universal means for connecting the upper shaft with the vehicle drive shaft whereby the shafts are driven thereby, a shaft for connecting the lower shaft of the gear box with the differential of the first rear axle whereby said axle is rotated, the connecting shaft having a universal joint at each end thereof, whereby said differential may undergo a universal movement, a second gear box having upper and lower shafts which are drivingly connected to each other, universal means for connecting the upper shafts of the boxes together, and a shaft for connecting the lower shaft of the second gear box with the differential of the second axle, whereby both axles are driven by the vehicle drive shaft, the last-named connecting shaft having universal joints at each end thereof, whereby the last-named differential may undergo universal movement without breaking the driving connection between said differential and the second gear box.

2. The combination with a motor vehicle having a pair of rear axles with ground wheels mounted thereon and also having a drive shaft, of a power transmitting mechanism including, a gear box having an upper shaft and a lower shaft which shafts are drivingly connected to each other, a universal joint for connecting the upper shaft with the vehicle drive shaft whereby the shafts are driven thereby, a telescoping shaft for connecting the lower shaft of the gear box with the differential of the forward axle whereby said axle is rotated, a universal joint at each end of the telescoping shaft whereby said differential may undergo a universal movement, a second gear box having upper and lower shafts which are drivingly connected to each other, a shaft having universal joints at each end thereof for connecting the upper shafts of the boxes together, whereby movement of the boxes with relation to each other is permitted without breaking the driving connection therebetween, and a telescoping shaft for connecting the lower shaft of the second gear box with the differential of the second axle, the last-named telescoping shaft having universal joints at each end thereof, whereby the telescoping and universal connection arrangement permits universal movement of said second differential without breaking the driving connection.

3. The combination with a motor vehicle having a pair of rear axles with ground wheels mounted thereon and also having a drive shaft, of a power transmitting mechanism including, a gear box having an upper shaft and a lower shaft which shafts are drivingly connected to each other, a universal joint for connecting the upper shaft with the vehicle drive shaft whereby the shafts are driven thereby, a telescoping shaft for connecting the lower shaft of the gear box with the differential of the forward axle whereby said axle is rotated, a universal joint at each end of the telescoping shaft whereby said differential may undergo a universal movement, a second gear box mounted behind the front axle and having upper and lower shafts which are drivingly connected to each other, a horizontal shaft overlying said front axle for connecting the upper shafts of the boxes together, the connecting shaft being telescopically arranged and having a universal joint at each end thereof, whereby movement of the boxes with relation to each other is permitted without breaking the driving connection therebetween, and a telescoping shaft for connecting the lower shaft of the second gear box with the differential of the second axle, the last-named telescoping shaft having universal joints at each end thereof, whereby said second differential may undergo universal movement without breaking the driving connection between the differential and the second gear box.

4. The combination with a motor vehicle having a pair of rear axles with ground wheels mounted thereon and also having a drive shaft, of a power transmitting mechanism including, a gear box having an upper shaft and a lower shaft which shafts are drivingly connected to each other, means for connecting the upper shaft with the vehicle drive shaft whereby the shafts of the gear box are driven thereby, means for connecting the lower shaft of the gear box with the differential of one of said axles, whereby said axle is rotated, means for establishing a driving connection between the upper shaft of the gear box and the differential of the other axle, whereby both axles are driven from the vehicle drive shaft, a torque assembly associated with each differential and including, a short transverse element rotatably mounted on the vehicle forwardly of each axle, and an elongate longitudinal rod connected to each differential and slidable through its respective transverse element for reinforcing the differential, whereby each differential is maintained in its proper driving position during movement of the same relative to said vehicle and its respective driving connection means.

5. The combination with a motor vehicle having a pair of rear axles with ground wheels mounted thereon and also having a drive shaft, of a power transmitting mechanism including, a gear box having an upper shaft and a lower shaft which shafts are drivingly connected to each other, a universal joint for connecting the upper shaft with the vehicle drive shaft whereby the shafts are driven thereby, a telescoping shaft for connecting the lower shaft of the gear box with the differential of the forward axle whereby said axle is rotated, a universal joint at each end of the telescoping shaft whereby said differential may undergo a universal movement, a second gear box having upper and lower shafts which are drivingly connected to each other, a shaft having universal joints at each end thereof for connecting the upper shafts of the boxes together, whereby movement of the boxes with relation to each other is permitted without breaking the driving connection therebetween, a telescoping shaft for connecting the lower shaft of the second gear box with the differential of the second axle, the last-named telescoping shaft having universal joints at each end thereof, whereby the telescoping and universal connection arrangement permits universal movement of said second differential without breaking the driving connection, a torque assembly associated with each differential and including, a short transverse element rotatably mounted on each gear box, and an elongate longitudinal rod connected to each differential and slidable through the transverse element mounted on its respective gear box for reinforcing said differential, whereby each differential is maintained in its proper driving position during movement of the same relative to its respective gear box.

CLARENCE S. SINGLETON.